United States Patent
Goodings et al.

(10) Patent No.: US 7,020,119 B2
(45) Date of Patent: Mar. 28, 2006

(54) METHOD AND APPARATUS FOR DIGITAL AUDIO TRANSMISSION

(75) Inventors: Chris J. Goodings, Fleet (GB); Sukhdeep Hundal, Surrey (CA); Guy Supajet Pothiboon, Richmond (CA)

(73) Assignee: Vtech Communications, Ltd., Tai Po (HK)

(*) Notice: Subject to any disclaimer, the term of this patent is extended or adjusted under 35 U.S.C. 154(b) by 844 days.

(21) Appl. No.: 10/059,568

(22) Filed: Jan. 29, 2002

(65) Prior Publication Data

US 2003/0002473 A1    Jan. 2, 2003

(30) Foreign Application Priority Data

Jan. 29, 2001  (GB)  .................................. 0102261

(51) Int. Cl.
*H04Q 7/24*    (2006.01)

(52) U.S. Cl. .......................................... 370/338; 714/48
(58) Field of Classification Search ............... None
See application file for complete search history.

(56) References Cited

U.S. PATENT DOCUMENTS

| | | | |
|---|---|---|---|
| 5,600,629 A | 2/1997 | Van Daele et al. | |
| 6,934,756 B1* | 8/2005 | Maes | 709/227 |
| 2001/0002906 A1* | 6/2001 | Rune | 370/345 |
| 2003/0002473 A1 | 1/2003 | Goodings et al. | 370/349 |
| 2004/0047310 A1* | 3/2004 | Chen et al. | 370/329 |
| 2005/0124384 A1* | 6/2005 | Izumi | 455/557 |

FOREIGN PATENT DOCUMENTS

| | | |
|---|---|---|
| GB | 2 314 746 | 1/1998 |
| GB | 0015199.3 | 8/2000 |
| GB | 2 363 944 | 1/2002 |
| GB | 0202030.3 | 12/2002 |

(Continued)

OTHER PUBLICATIONS

Jennifer Bray and Charles F. Sturman, *BLUETOOTH Connect Without Cables*, 41-61, 91-100, 191-217 (Prentice-Hall Inc., New Jersey, 2001).

(Continued)

*Primary Examiner*—Duc Ho
(74) *Attorney, Agent, or Firm*—Pillsbury Winthrop Shaw Pittman LLP

(57) ABSTRACT

A cordless telephone implementing using a BLUETOOTH wireless bearer is presented. A BLUETOOTH voice data structure is implemented by coding the voice data at a bitrate below 64 kb/s, such that the full number of payload bits provided by the BLUETOOTH voice data structure are not required for transmission of voice data. The packet payload is then encoded in a non-standard format to implement a robust error detection and/or correction protocol for the voice data, as well as for the provision of a low-rate data channel for transmission of information such as caller ID. Alternatively, a BLUETOOTH non-voice data structure can be employed by transmitting encoded voice data as user payload bits. The data link is then flushed each time new voice data is ready for sending by the transmitting device. If slots are available before the data link is flushed, unsuccessfully transmitted data can be automatically resent, thereby implementing time and frequency diversity.

22 Claims, 4 Drawing Sheets

FOREIGN PATENT DOCUMENTS

| WO | WO 01/05172 A1 | 7/2001 |
|---|---|---|
| WO | WO01/52466 A1 | 7/2001 |
| WO | WO 01/97385 | 12/2001 |

OTHER PUBLICATIONS

*BLUETOOTH Specification Version 1.0 B*, "Part B Baseband Specification," 54-69 (Bluetooth SIG, Inc., Nov. 29, 1999).

http://www.sysopt.com/articles/bluetooth/index2.html, "Bluetooth technology and implications", Dec. 14, 1999, Heidi Monson.

Copy of U.K. Search Report dated Jul. 10, 2002.

J. Haartsen, W. Allen, J. Inouye, O. Joeressen and M. Naghshineh, "Bluetooth: Vision, Goals, and Architecture," Mobile Computing and Communications Review, vol. 1, No. 2 (pp. 1-8).

Copy of Uk Search Report dated Jul. 9, 2003.

Copy of Uk Search Report dated Jun. 26, 2003.

http://www.pday.com.cn/technology/bluetooth_documents/BaseBand.pdf,"Bluetooth Specification Version 1.0A", Baseband Specification, Jul. 24, 1999.

* cited by examiner

Note: HV3' is a modified form of the HV3 format

METHOD AND APPARATUS FOR DIGITAL AUDIO TRANSMISSION

BACKGROUND OF THE INVENTION

1. Field of the Invention

This invention relates in general to a cordless telephone system. In particular, the invention relates to the implementation of a cordless telephone system using the BLUETOOTH wireless digital communications standard.

2. Background Art

BLUETOOTH is an emerging wireless standard, operating in the 2.4 GHz ISM band world-wide according to existing specifications known in the art and publicly available. Although originally developed for use in the mobile phone industry, widespread adoption within the consumer electronics industry suggests that it is likely to become a popular and commonplace home wireless standard in the coming years. Due to it's predicted penetration into the consumer market, it is of considerable interest to use the BLUETOOTH standard as the bearer for a cordless telephone system.

In it's basic form, a cordless telephone system consists of a basestation that is connected to the Public Switched Telephone Network ("PSTN") and that communicates wirelessly to a handset. The principal data exchanged between the basestation and handset is voice data (the telephone call), although a small amount of control data and information may also be exchanged. The system can be (and has been) extended to multiple PSTN connections and multiple handsets.

Several characteristics for a wireless communications link are desirable in implementing a cordless telephony platform. Such characteristics include: 1) the provision of at least two full-duplex voice links to support multiple handsets; 2) a low-speed data link in parallel with voice links for system communication such as caller ID information; 3) a high-speed data link to provide for transmission of call setup information with minimal delay; 4) robust error detection and/or error correction on voice and data links to ensure high-quality and uninterrupted communications; and 5) implementation of one or more high-speed data links in parallel with the voice link(s).

However, the transmission formats defined by the BLUETOOTH specification do not provide a combination of these characteristics that is typically desirable for cordless telephony. Three Synchronous Connection-Oriented ("SCO") packet types are defined in the BLUETOOTH standard specifically for voice transmission (namely, HV1, HV2 and HV3). A SCO link is a point-to-point, circuit-switched connection between a master and a slave. The BLUETOOTH SCO links employ varying error correction schemes where Forward Error Correction ("FEC") may or may not be available to protect the transmitted data. HV1 uses ⅓ rate FEC and allows 10 bytes of data; HV2 uses ⅔ rate FEC and allows 20 bytes of data; and HV3 uses no FEC and allows 30 bytes of data. The packet header is always protected by ⅓ rate FEC.

The BLUETOOTH HV1 format occupies the complete channel bandwidth for a single link, and is thus unable to support multiple handsets or a parallel data channel. In contrast, the HV3 link occupies a reduced bandwidth but does not contain error detection which is required for implementation of a high-quality voice link. The HV2 format allows two full-duplex voice links but lacks the desired parallel data capability. Such parallel data capabilities may be a primary motivation for moving to a BLUETOOTH wireless bearer. Furthermore, even BLUETOOTH's voice links which provide error correction do not provide error detection. Therefore, packets received with errors that are not properly corrected cannot be readily muted, potentially exposing the data recipient to unpleasant audible noise.

Thus, the voice formats defined by the BLUETOOTH standard are generally unsatisfactory for many advanced cordless telephone applications. However, if the limitations of the formats could be overcome, it would be desirable to implement a BLUETOOTH-based cordless telephone system so that the base unit can also serve as a BLUETOOTH gateway, thereby enabling advanced communications with a variety of electronic devices with minimal added expense.

SUMMARY OF THE INVENTION

A technique for transmitting voice data via a BLUETOOTH communications link is presented. A synchronous BLUETOOTH link can be implemented to provide improved error detection capabilities and/or parallel data communications capabilities. The audio data is encoded at a bitrate less than that specified for the synchronous link. The link packet payload is then encoded to comprise the audio data and an error detection field. A parallel data channel may also be encoded within the packet payload. Upon receipt of the packet by a second device, the packet payload is decoded and the digitized audio data is extracted and verified.

An asynchronous BLUETOOTH link can also be implemented to provide improved error detection capabilities, parallel data communications and/or a greater number of simultaneous cordless telephone links. The asynchronous link packet payloads are formed including digitized audio data and various other information. Each packet is then transmitted. Transmissions can be repeated on subsequent time slots if an acknowledgement is not received, or if the link is flushed. The link is flushed each time new digitized audio data is presented for transmission.

DETAILED DESCRIPTION OF THE INVENTION

Figure 1:
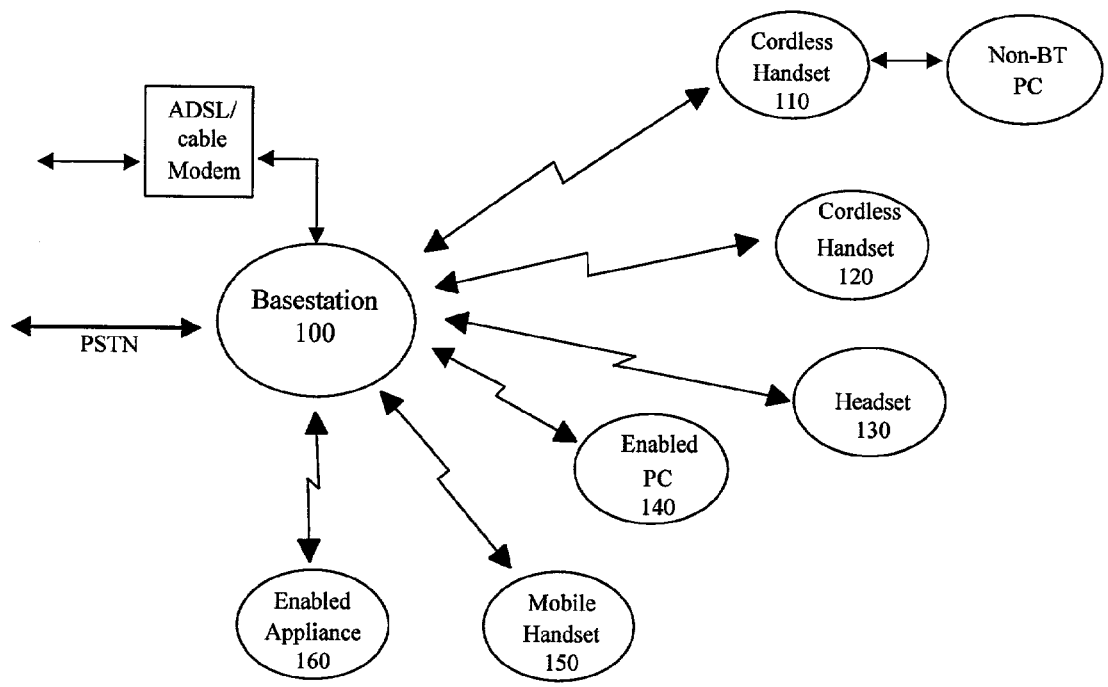
FIG. 1 is a block diagram of a cordless telephony system based upon a base station serving as a BLUETOOTH gateway for communication with a variety of BLUETOOTH-enabled devices.

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

One advantage of using the BLUETOOTH standard as a wireless bearer is to additionally allow the wireless communication of data (as opposed to voice) between the basestation and various data terminals. In this context, the basestation would be termed a gateway. An example embodiment of this type of system including cordless telephone functionality is shown in FIG. 1. The system of FIG. 1 implements a proprietary link based upon the BLUETOOTH air interface for communications between gateway 100 and cordless telephony devices such as handsets 110 and 120 or cordless telephone headset 130. However, gateway 100 is likewise fully capable of communicating via conventional BLUETOOTH links with other BLUETOOTH-enabled devices, such as personal computer 140, mobile phone handset 150 or BLUETOOTH-enabled appliance 160.

In the embodiment of FIG. 1, base station 100 is provided with the capability of querying other BLUETOOTH-based devices to determine which, if any, available devices are capable of communicating via an appropriate proprietary extension of the BLUETOOTH protocol. One mechanism that can be used to implement such a query is the Service Discovery Protocol ("SDP") defined under the BLUETOOTH protocol set. This mechanism allows for identifying the specific classes of service that are available for use. SDP further allows for the retrieval of attributes that are needed to connect to a chosen service. Thus, attributes required to defined proprietary services can be configured and communicated using SDP.

For significant multi-handset capabilities under the standard BLUETOOTH specifications, the HV3 structure could be used. As defined by the BLUETOOTH standard, the HV3 structure allows up to three full-duplex voice links to be established. However, the BLUETOOTH specification provides no error detection or correction on HV3 voice data. This is a serious disadvantage for a voice system since it will not be possible to mute the audio during periods of bad interference. As a result, the users may be subjected to harsh and annoying audible noise when communication errors occur.

The HV2 format defined by the BLUETOOTH standard allows for two active duplex links with error correction and thus is another potential format for use in a cordless system. However, one disadvantage of using HV2 is that, if both voice links are active, there is no bandwidth available for parallel data, thus impairing the functionality of the cordless telephone system. A fully-functional HV2-based system would be possible if it was restricted to one active handset plus data. While additional handsets could be provided, only one could be active at one time. Furthermore, while HV2 provides for error correction, it does not provide for error detection. Thus, when the provided FEC capabilities are insufficient to correct an error, erroneous data is processed, potentially subjecting the user to hard and annoying audible noise.

The specifications of the BLUETOOTH standard can be augmented in accordance with the present invention to overcome such drawbacks and to implement a fully-functional multi-handset cordless telephone system using the BLUETOOTH standard as the wireless bearer. Moreover, by implementing the augmentations as proprietary extensions for communicating with proprietary handsets, the base unit remains free to engage in communications with other non-proprietary BLUETOOTH-enabled devices, serving as a BLUETOOTH gateway, with minimal extra cost or complexity of design.

One of the key issues with using a standard BLUETOOTH format for a cordless system is the number of active voice channels that can be supported. As explained above, the number of cordless channels using the standard formats is effectively limited to two (with no bandwidth remaining for an independent data channel) or one (with enough bandwidth remaining to support an independent data channel). However, multiple-handset telephone systems are becoming increasingly popular and desirable. Therefore, an increase in the number of channels that can be supported with high-quality links and full-featured communications capabilities is of great importance.

Figure 2:
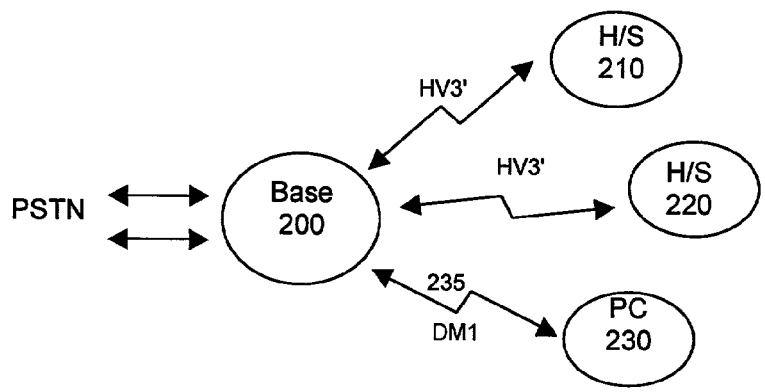
FIG. 2 is a BLUETOOTH-based cordless telephone system using modified HV3 links for telephonic communications.

FIG. 2 illustrates another embodiment of a cordless telephone system in which base station 200 serves as a gateway to communicate with conventional BLUETOOTH-enabled devices such as personal computer 230, while simultaneously being capable of communications with cordless telephone handsets 210 and 220 using a proprietary extension of a standard BLUETOOTH HV3 link (HV'), such as a link comprised of HV3 packets with altered payload structures.

Figure 3:
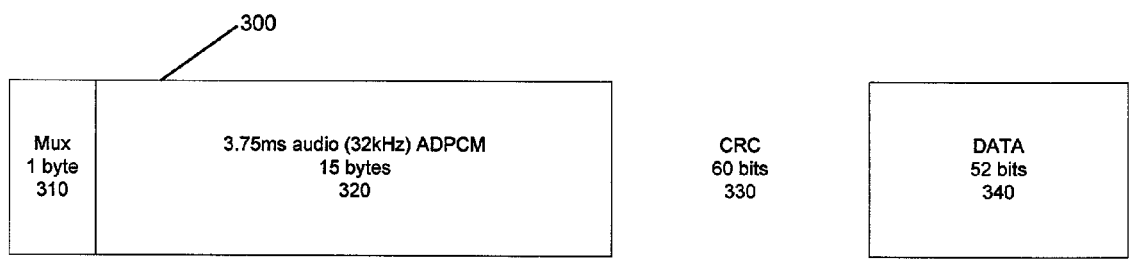
FIG. 3 is an embodiment of an HV3 data packet modified for telephonic applications, in accordance with one aspect of the invention.

FIG. 3 illustrates such an altered HV3 payload structure according to one possible embodiment of the invention, which can be used in communications between base station 200 and cordless handsets 210 and 220. The HV3 packet structure is maintained, but the traffic contained within it is further encoded. The HV3 packet normally provides 240 payload bits per packet with no error correction or detection. A compliant BLUETOOTH system must support 64 kb/s CVSD (Continuous Variable Slope Delta) Modulation for encoding of audible information, and may also support 64 kb/s log PCM format (A-law or μ-law), Implemented with 64 kb/s voice coding according to the BLUETOOTH specification. Using the specified voice encoders, an HV3 packet transports 3.75 ms of speech and HV3 can support up to 3 duplex voice links. However, the lack of data capacity and error detection makes HV3 only marginally useful in a cordless system.

Therefore, the modified HV3 payload structure 300 of FIG. 3 includes voice data field 320 which contains audible information encoded at 32 kbps using an ADPCM format. This format provides sufficient audio quality for high-quality telephonic communications. By using this proprietary voice encoding, the modified HV3 payload structure contains the same 3.75 ms of speech information contained within a standard HV3 packet, while requiring only 120 of the 240 HV3 payload bits. Therefore, further data fields can be encoded into the HV3 payload to provide improved cordless telephone functionality. It is further understood that other voice encoding techniques which reduce the audio bitrate below that implemented in a standard HV3 link can be utilized as well, such as reduced-rate CVSD modulation or audio compression algorithms. Generally speaking, lower bitrate audio encoding techniques provide greater bandwidth within packet payload 300 for encoding of other types of information.

In the payload structure of FIG. 3, field 310 provides one byte of mux information, such as information specifying the voice data compression algorithm and/or other proprietary formatting information. Error detection/correction field 330 contains 60 bits of CRC information for the audio data contained in field 320. Unlike the FEC provided by the BLUETOOTH standard, CRC field 330 allows some errors to be corrected, and further allows for uncorrectable errors to be detected such that erroneous audio information can be appropriately muted. Finally, 52-bit field 340 provides for a low-rate data channel which can be used for features such as the transmission of caller identification information.

The system of FIG. 2 can support up to three active links. Because the basic HV3 packet structure is maintained, the links may be any combination of proprietary voice links with payload structures such as that FIG. 3, and conventional communications pursuant to the BLUETOOTH specification, such as data link 235 between base station 200 and personal computer 230.

Figure 4:
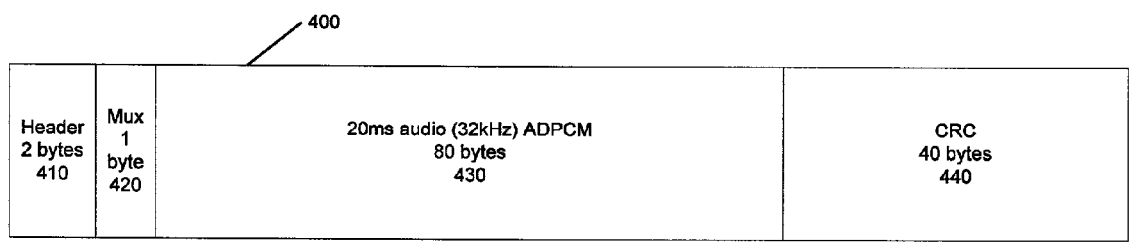
FIG. 4 is an embodiment of a DM3 data packet with payload adapted for telephonic communications, in accordance with another aspect of the invention.

In accordance with another aspect of the invention, voice data can be transmitted using the BLUETOOTH data format links, rather than using the BLUETOOTH voice format links. By using data links, the transmission format can essentially be redefined completely. FIG. 4 illustrates one possible payload structure 400 of an embodiment based upon a DM3 link, according to this aspect of the invention. Field 410 provides two bytes for a header. As in the payload structure 300 of FIG. 3, a one-byte multiplex field is provided by field 420. Audio field 430 contains 80 bytes of encoded voice data, which corresponds to 20 ms of audio information when encoded using a 32 kbps ADPCM format. Finally, error detection/correct field 440 contains 40 bytes of CRC information which can be used to correct and/or detect errors imposed during transmission of the payload. CRC field 440 can be configured to independently protect a plurality of subsets of the audio data within field 430. In such an embodiment, when uncorrectable errors occur only the subset of data containing the error needs to be thrown out, thereby reducing the significance of the resulting dropout in the audio stream, compared to CRC protection schemes that protect the entirety of the payload such that an entire packet of audio data would have to be thrown out. As with the payload structure 300 of FIG. 3, the payload structure 400 of FIG. 4 could readily include voice data encoded using other techniques, (i.e. at other bitrates and using other algorithms), and a parallel data channel could readily be defined over the same DM3 link by including allocation for data within the payload structure 400 of FIG. 4.

However, the non-voice BLUETOOTH data links such as DM3 are normally asynchronous communication links (sometimes referred to as an Asynchronous Connection-Less ("ACL") link). Asynchronous links are typically undesirable for voice communications because of the timeliness required of the voice data transmission. Inasmuch as the normal operation of the ACL link is asynchronous, the recipient device automatically generates an ACK or NAK acknowledgment return signal to signify successful or unsuccessful reception of each data packet. The sender then retransmits the data unless and until an ACK signal is returned to the sender. However, for telephonic communications, voice data should preferably be transmitted and reproduced in near real time to enable efficient and natural conversation. Thus, only a certain limited amount of retransmission is allowable until the next voice data frame must be sent.

Figure 5:
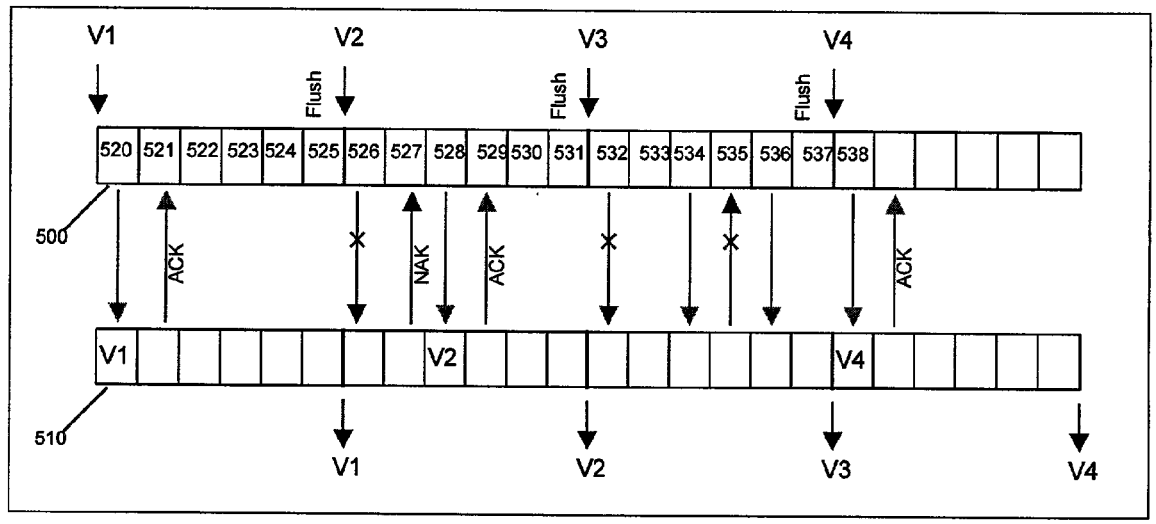
FIG. 5 is a chart illustrating transmissions over time of a cordless telephone voice data using an asynchronous BLUETOOTH data link.

An embodiment of the system, implementing a DM3 link with the payload structure illustrated in FIG. 5 for voice communications, can overcome the problems of an asynchronous data format by forcing the format to behave in a somewhat synchronous manner. This can be achieved by using a mechanism within the BLUETOOTH specification known as isochronous data transmission, which limits the automatic retransmission of data. The mechanism uses a "flush" command to prevent retransmission of data after a certain period of time has elapsed even if an ACK has not been received.

By using the flush mechanism in conjunction with a DM3 link with the payload structure 400 of FIG. 4, the voice communications link can also gain the benefit of time and frequency diversity for increased robustness and reliability. The automatic retransmission of voice data occurs according to the ACK/NAK protocol until the data channel is flushed. The system can be configured to flush the data channel upon receipt of each new frame of audio data by the transmitting interface. Thus, the transmitter always sends new voice data immediately upon receipt, resulting in prompt transmission of the audio signal. Any retransmissions of already-sent data that take place prior to the flushing of the channel occur at a different time from the initial transmission, and also at a different carrier frequency since BLUETOOTH is a frequency-hopping standard, thereby providing frequency and time diversity to further improve the reliability and robustness of the communication system.

The operation of this system is illustrated in FIG. 5 which shows the transmission of four voice data packets, labelled V1 through V4, over a poor link, such as might be encountered in the presence of high-level radio frequency interference. Each box represents a new BLUETOOTH packet, proceeding in time from left to right, with row 500 representing the transmitting device and row 510 representing the receiving device. Because the BLUETOOTH standard is based upon a frequency-hopping radio protocol, transmissions during each box occur on a radio carrier frequency which differs from the previous transmission. The number of possible retransmissions before the next voice packet is available (and therefore before the data link is flushed) will typically depend upon the amount of data traffic in the system as a whole and the amount of voice data carried in each packet. Typically, the gateway or base station acts as the master and accordingly prioritizes required data transmissions. If transmission of extraneous data traffic with other devices is given greater priority than retransmissions of voice data, then such extraneous traffic may reduce or eliminate the opportunities for data retransmissions before the link is flushed.

For example, in FIG. 5, data packet V1 is transmitted and successfully received during period 520. Thus, the receiving unit acknowledges successful receipt during period 521, and both units idle during periods 522 through 525, thus conserving power. At period 525, new data is received by the transmitting unit, so the data link is flushed. Then, during period 526, data packet V2 is transmitted to the receiving unit. Assume for example that due to interference, the received data fails to satisfy the error detection and/or correction mechanisms implemented within the data packet. Accordingly, the receiving unit responds with a NAK signal during period 527. The transmitting unit, discovering that packet V2 has not been properly received, retransmits packet V2 during period 528. The receiving unit receives V2, and responds with an ACK signal, such that both units idle during periods 530 and 531. At period 532, data packet V3 is transmitted. However, again for example assume that due to interference the packet is not received by the receiving unit. Accordingly, neither an ACK or NAK is sent back during period 533. The transmitting unit, pursuant to its data transmission protocol, automatically resends the data packet V3 during period 534. The transmission is successful, but the receiving unit's ACK response during period 535 is blocked by interference. The transmitting unit, not having received an ACK for V3, makes a final attempt to transmit V3 during period 536. The data link is then flushed to ensure that V4 will be transmitted in a timely manner in period 538.

While the ACL link data packet payload 400 of FIG. 4 is based upon a DM3 link, it is understood that similar payloads could readily be derived for other known BLUETOOTH ACL types as well, such as DM1, DH1, DH3, DM5 or DH5. However, DM3 is more efficient than smaller packet structures such as DM1 in that the ratio of overhead to payload is lower. While larger packets such as DM5 or DH5 have a very large capacity for voice data, such packets may not be appropriate for some telephony applications due to latency in the audio path. Each segment of speech must be compressed into a data packet, transmitted, and expanded back into audible information before it is heard by the recipient. Thus, a delay comprised of at least approximately the period of speech contained in one packet (required for buffering of the raw audio data before compression, transmission, decompression and playback) is imposed upon the communications channel. Because the larger packets would contain comparatively lengthy periods of speech in each packet, the inherent delay in the communications channel may result in undesirable audible characteristics. Therefore, packet types such as DM3 (using either 64 kb/s or 32 kb/s voice encoding) or DH1 (using 32 kb/s) may be effective for many cordless telephony applications.

For a cordless telephone system implemented using DM3 links and 64 kb/s voice encoding with the payload structure of FIG. 4, each DM3 packet holds 10 ms of encoded voice data along with 40 bytes of CRC error detection/correction information. Thus, given the time slot period of the BLUETOOTH specification, a packet would be needed in each direction every 16 slots to maintain an uninterrupted full-duplex audio link. Up to 2 full-duplex voice links could be provided on a BLUETOOTH bearer, with some capacity remaining for other data links as well. For one active voice link, several retransmissions may be possible if needed as a result of a NAK, while for two active voice links only one retransmission would be possible.

For a cordless telephone system implemented using DM3 links and 32 kb/s voice encoding with the payload structure 400 of FIG. 4, each DM3 packet could hold 20 ms of encoded voice data along with 40 bytes of CRC error detection/correction information. Thus, given the time slot period of the BLUETOOTH specification, a packet would be needed in each direction every 32 slots. Up to 5 full-duplex voice links could be provided, with some capacity remaining for other data links as well. Moreover, a number of packet retransmissions may be available, depending upon the number of active links in the system. It is believed that an audio latency of approximately 20 ms, as is inherent in such a system, should be acceptable for a voice communication link.

Figure 6:
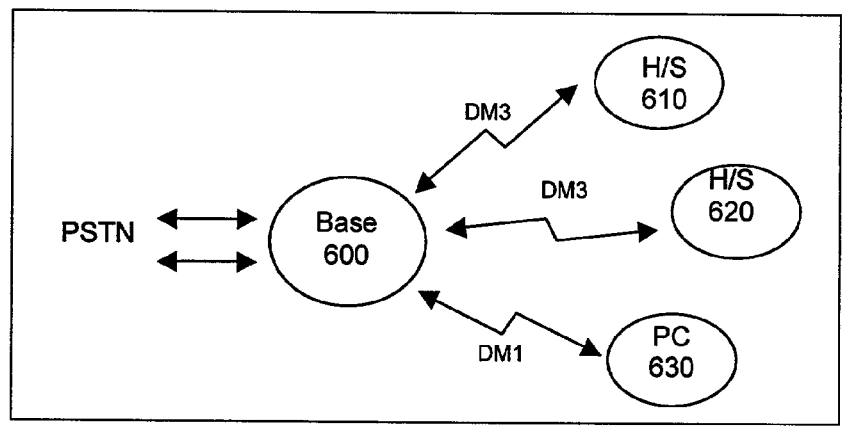
FIG. 6 illustrates a cordless telephone system using asynchronous BLUETOOTH data links for voice transmission.

A further embodiment of a BLUETOOTH-based cordless telephony system using ACL links is illustrated in FIG. 6. Base unit 600 communicates with cordless handsets 610 and 620 using DM3 links with the payload structure 400 of FIG. 4 for voice transmission. Furthermore, base unit 600 is capable of simultaneously communicating with a BLUETOOTH-enabled digital device such as personal computer 630 using a DM1 link.

Figure 7:
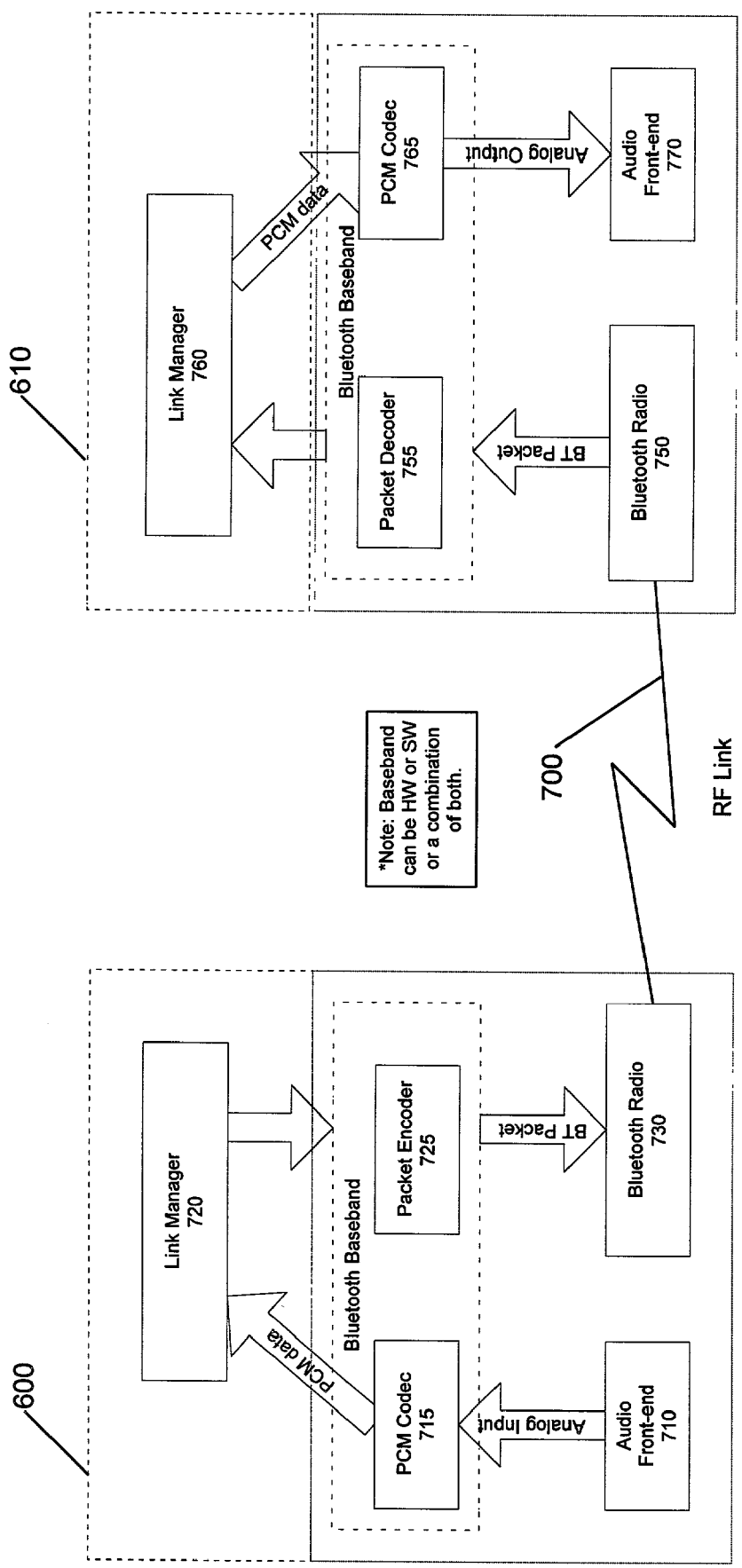
FIG. 7 is a functional block diagram of a voice communications path from a cordless telephone base station to a handset.

FIG. 7 is a functional block diagram of the downlink between base unit 600 and cordless handset 610 connected by DM3 link 700, whereby voice signals are transmitted from the PSTN to handset 610. An analog audio signal is receiving from the PSTN at audio front end 710, and conveyed to PCM codec 715 for digitization. The PCM voice data is then conveyed to link manager 720. Link manager 720 processes the audio information in accordance with the proprietary link type selected for the communication link. For example, in the illustrated example, link manager 720 may determine and insert the CRC, mux and header fields. In a system where link 700 was a modified HV3 with a payload structure of FIG. 3, the link manager could also insert data content corresponding to the relevant traffic for parallel data channel 340.

Link manager 720 outputs encoded payload data to packet encoder 725. Packet encoder 725 performs the packet formatting according to the type of link upon which link 700 is based, such as inserting the packet header and the encoded payload data into their appropriate positions within the packet. The formed packet is then conveyed to BLUETOOTH radio unit 730, which transmits the information wirelessly via link 700.

Handset radio 750 receives the transmitted information and outputs the packet to packet decoder 755. Packet decoder 755 extricates the encoded payload information, which is then conveyed to handset link manager 760. Link manager 760 further extracts the encoded audio data from the encoded payload, and sends the audio data to PCM codec 765. Codec 765 converts the digital audio data into an analog audio signal and sends the signal to audio front-end 770, which may include a speaker positioned within the telephone handset. In this way, an audio signal can be conveyed between devices using a BLUETOOTH bearer, while implementing proprietary features capable of providing a more robust and full-featured cordless telephony solution.

The uplink from handset 610 to base station 600 operates analogously to the downlink illustrated in FIG. 7. Furthermore, the functional block diagram of FIG. 7 can be used to also implement the transmission of voice data using a link based upon a SCO BLUETOOTH link, such as that illustrated in FIGS. 2 and 3. It is further contemplated that the BLUETOOTH baseband operations can readily be implemented in hardware, software or a combination of both. Many other configurations could be readily implemented in place of that of FIG. 7 in which the actual handling of the encoded voice data is performed in higher layers.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

We claim:

1. A method for transmitting digitized audio data from a first wireless device to a second wireless device using a BLUETOOTH wireless communications link implementing a packet-based communications protocol, the protocol providing for a data packet structure having a payload that is based upon audio data typically encoded at a first bitrate, the method comprising the steps of:
   encoding the digitized audio data at a second bitrate, whereby the second bitrate is lower than the first bitrate;
   generating an error detection code derived from the digitized audio data;
   forming a data packet with modified payload information comprised of the audio data encoded at the second bitrate and the error detection code;

transmitting the data packet via the wireless communications link, wherein the modified payload information is further comprised of an auxiliary data field containing information that is not of an audio signal.

2. The method of claim 1, in which the wireless communications link is a synchronous connection-oriented link.

3. The method of claim 1, in which the first bitrate is approximately 64 kilohertz and the second bitrate is approximately 32 kilohertz.

4. The method of claim 1, in which the step of encoding the digitized audio data at a second bitrate is further comprised of the step of encoding the digitized audio data in an ADPCM format.

5. The method of claim 1, in which the step of forming a data packet further comprises the substep of forming a data packet having the structure of a BLUETOOTH HV3 packet containing the modified payload information.

6. The method of claim 1, further comprising the steps of:
  extracting the encoded payload from the data packet by the second wireless device;
  detecting that the encoded audio data was received without errors by implementing an error detection protocol associated with the error detection code.

7. The method of claim 1, which method further includes the preceding step of:
  determining that the second wireless device is capable of communicating using a packet structure other than that defined by the communications protocol.

8. The method of claim 7, in which the step of determining that the second device is capable of communicating using a packet structure other than that defined by the communications protocol further comprises the substep of utilizing the BLUETOOTH Service Discovery Protocol to determine whether the second device is capable of communicating using a proprietary packet format.

9. The method of claim 8, in which the proprietary packet format includes payload comprised of digitized audio information encoded at the second bitrate and an error detection code derived from the digitized audio information.

10. The method of claim 1, which method further includes the preceding step of:
  determining that the second wireless device is capable of communicating using a non-standard link that is derived from a BLUETOOTH Synchronous Connection-Oriented communications link.

11. The method of claim 1, in which the modified payload information is further comprised of information indicative of the encoding technique employed in the step of encoding the digitized audio data.

12. The method of claim 1, in which the auxiliary data field contains telephone caller identification information.

13. A method of forming a data packet for the transmission of a digital audio signal using a packet-based synchronous connection-oriented BLUETOOTH communication link, which link is capable of transmitting audio data typically encoded at a first bitrate within payload portions of a plurality of data packets, the method comprising the steps of:
  encoding the digital audio signal at a second bitrate, where the second bitrate is lower than the first bitrate;
  generating an error detection field derived from the digital audio signal;
  forming the data packet with the payload portion comprising the digital audio signal encoded at the second bitrate and the error detection field, wherein the payload portion is modified to further comprise of an auxiliary data field containing information that is not representative of an audio signal.

14. A method for transmitting a digitally encoded audio signal from a first wireless device having a transmitter to a second wireless device via a BLUETOOTH asynchronous connectionless link, which method comprises the steps of:
  receiving a first portion of encoded audio signal at the transmitter of the first wireless device;
  generating an error detection code derived from the first portion of encoded audio signal;
  generating a data packet having a payload comprised of the first portion of encoded audio signal and the error detection code;
  extracting the payload from the data packet by the second wireless device;
  detecting whether the payload received contains errors by implementing an error detection protocol using the error detection code received within the payload;
  generating an analog audio signal by the second device when the payload received does not contain errors, the analog audio signal being derived from the first portion of encoded audio signal;
  discarding the first portion of encoded audio signal by the second device when the payload received contains errors;
  transmitting the data packet from the first device to the second device via the asynchronous connectionless link;
  flushing the asynchronous connectionless link approximately when the first device transmitter receives a second portion of encoded audio signal for transmission to the second wireless device.

15. The method of claim 14, in which the data packet has the structure of a BLUETOOTH DM3 packet containing the payload.

16. The method of claim 14, in which the step of transmitting the data packet is comprised of the substep of repeatedly retransmitting the data packet by the first device unless and until an acknowledge signal is received from the second device indicating the audio signal has been received without error, or the asynchronous connectionless link is flushed.

17. The method of claim 14, in which the data packet is further comprised of information indicative of the technique with which the first portion of encoded audio signal is encoded.

18. The method of claim 14, in which the data packet is further comprised of an auxiliary data field containing information that is not representative of an audio signal.

19. The method of claim 18, in which the auxiliary data field contains telephone caller identification information.

20. A method for communicating a digitally encoded audio signal from a first wireless device to a second wireless device via a BLUETOOTH wireless communications link, which method comprises the steps of:
  receiving a first portion of an encoded audio signal comprised of a plurality of data subsets by the first wireless device;
  generating an error detection code derived from the received encoded audio signal which independently protects each one of a plurality of data subsets within the first portion of encoded audio signal;
  generating a data packet comprised of the first portion of encoded audio signal and the error detection code;
  transmitting the data packet from the first device to the second device via the wireless communications link;
  determining for each of the plurality of data subsets whether the data subset was received with uncorrectable errors using the error detection code;

discarding only the contents of each data subset received with uncorrectable errors.

21. The method of claim 20, in which the communications link is an asynchronous connectionless link, the method further comprising the step of:

flushing the asynchronous connectionless link approximately when the first device receives a second portion of encoded audio signal for transmission.

22. An apparatus for transmitting digitized audio data from a first wireless device to a second wireless device using a packet-based BLUETOOTH wireless communications protocol, which apparatus is comprised of:

a digital audio encoder disposed within the first wireless device capable of generating the digitized audio data using one of at least a first and second encoding algorithm, where the first encoding algorithm encodes data at a first bitrate, and the second encoding algorithm encodes data at a second bitrate, where the second bitrate is lower than the first bitrate;

a first link manager associated with the first wireless device which processes the digitized audio data to generate a data packet payload, where the operation of the link manager depends upon the encoding algorithm implemented by the digital audio encoder, which link manager generates error detection data derived from the digitized audio data and associates the error detection data with the digitized audio data when the digital audio encoder implements the second encoding algorithm, such that the cumulative length of the error detection data and the digitized audio data encoded when using the second encoding algorithm is less than or equal to the length of the audio data had it been encoded using the first encoding algorithm;

a packet encoder which inserts the packet payload into a data packet having a payload field of predetermined length;

a radiofrequency transmitter associated with the first wireless device which transmits the data packet via a wireless communication link;

a radiofrequency receiver associated with the second wireless device which receives the data packet;

a packet decoder which extracts the payload from the received data packet;

a second link manager which receives the payload from the packet decoder and extracts the digitized audio data;

a digital audio decoder which receives the digitized audio data and generates an analog audio signal;

whereby the analog audio signal can be conveyed to a listener.

* * * * *